United States Patent [19]
Fukuoka et al.

[11] Patent Number: 6,001,951
[45] Date of Patent: Dec. 14, 1999

[54] AROMATIC POLYCARBODIIMIDE AND FILM THEREOF

[75] Inventors: Takahiro Fukuoka; Masahiro Yoshioka; Michie Sakamoto; Amane Mochizuki, all of Osaka, Japan

[73] Assignee: Nitto Denko Corporation, Osaka, Japan

[21] Appl. No.: 09/187,090

[22] Filed: Nov. 5, 1998

[30] Foreign Application Priority Data

Nov. 11, 1997 [JP] Japan .................................. 9-326989

[51] Int. Cl.⁶ .................................................. C08G 63/00
[52] U.S. Cl. .................................................. 528/176
[58] Field of Search ........................ 528/176, 310

[56] References Cited

U.S. PATENT DOCUMENTS 5,733,959  3/1998  Heitz et al. ............................. 524/195

FOREIGN PATENT DOCUMENTS 0 792 897 A1  9/1997  European Pat. Off. .

OTHER PUBLICATIONS

S.B. Idage et al., "Polyimides and Polyamide–Imides Containing Arylene Sulfone Ether Linkages," *Journal of Applied Polymer Science*, vol. 40, pp. 1023–1035, Sep. 1990.

S.B. Idage et al., "Synthesis and characterization of polyurethanes containing arylene sulfone ether linkages," Chemical Abstracts, vol. 114, No. 22, Jun. 1991.

Derwent Publication Ltd., London, GB, AN 119175, XP–002094029, "Produce polyimide soluble organic solvent", Abstract and JP 62 062808 A (Japan Synthetic Rubber) (Mar. 1985).

*Primary Examiner*—Terressa Mosley-Boykin
*Attorney, Agent, or Firm*—Sughrue, Mion, Zinn, Macpeak & Seas, PLLC

[57] ABSTRACT

An aromatic polycarbodiimide comprising a structural repeating unit represented by the following formula (I):

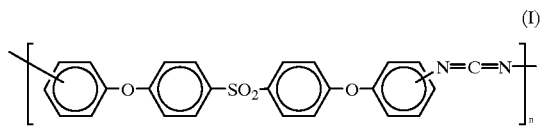

wherein n is an integer of 2 to 200.

12 Claims, 2 Drawing Sheets

AROMATIC POLYCARBODIIMIDE AND FILM THEREOF

FIELD OF THE INVENTION

The present invention relates to a novel aromatic polycarbodiimide. The aromatic polycarbodiimide of the present invention provides a film, an adhesive or a molding, having various excellent properties such as high heat resistance.

BACKGROUND OF THE INVENTION

There have conventionally been known some aromatic polycarbodiimides obtained by polymerizing diphenylmethane diisocyanate (MDI) or tolylene diisocyanate (TDI) as a monomer. Such polycarbodiimides are used as a flame-retardant film or a heat-resistant adhesive because of its excellent heat resistance.

Although the polycarbodiimide film has a heat-resistance in the point that a volatile gas or decomposed monomer is not generated even if it is exposed to a high temperature of 400° C. or more, if it has a low-moisture resistance or it is thermally treated at a temperature of 200° C. or more, it will lose a self-supporting property and become brittle. As the result, the film cannot be practically used. Furthermore, the polymer has a low solubility in an organic solvent and has a low processability.

SUMMARY OF THE INVENTION

As a result of various investigations on various aromatic polymers in order to solve such disadvantages of the conventional polycarbodiimides, a novel polymer of the present invention could be produced.

Accordingly, an object of the present invention is to provide a novel aromatic polycarbodiimide.

The aromatic polycarbodiimide according to the present invention comprises a structural repeating unit represented by the following formula (I):

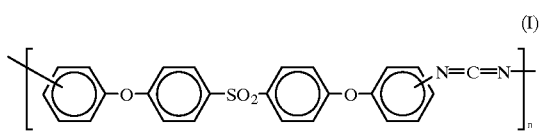

wherein n is an integer of 2 to 200.

This polymer is a novel high molecular weight compound, and has excellent solubility and extremely high thermal resistance. The polymer also has excellent adhesion, a low-temperature processability and moisture resistance. In relation to the polycarbodiimide of the present invention, the aromatic diisocyanate represented by the following formula (II):

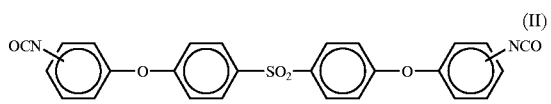

has been known (see Polym. Int. (1991), 24, 77 and J. Appl. Polym. Sci. (1990), 40, 1023). In these articles, however, it is not entirely described that polycarbodiimide can be obtained from this compound.

The polycarbodiimide according to the present invention can be obtained by polymerizing the diisocyanate, as a monomer, represented by the following formula (II):

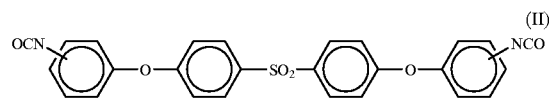

in the presence of a phosphorus catalyst according to a method known per se.

DETAILED DESCRIPTION OF THE INVENTION

Figure 1:
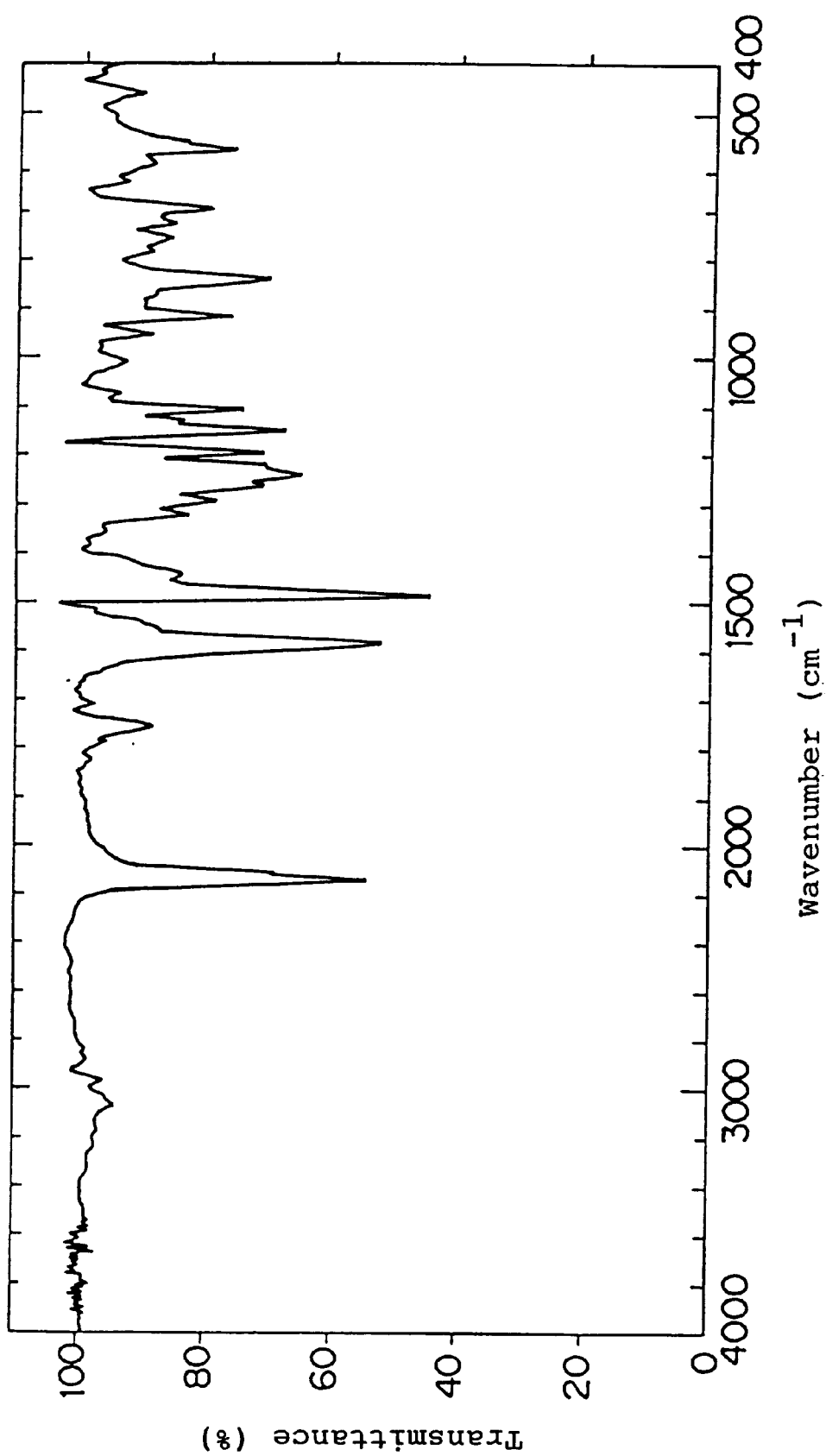
FIG. 1 is a graph showing an infrared absorption spectrum of the polycarbodiimide obtained in Example 1.

The above-described diisocyanate monomer can be used alone or can be used by copolymerizing with other organic diisocyanate such as 4,4'-diphenylmethane diisocyanate, 2,6-tolylene diisocyanate, 2,4-tolylene diisocyanate, 1-methoxyphenyl-2,4-diisocyanate, 3,3'-dimethoxy-4,4'-diphenylmethane diisocyanate, 4,4'-diphenylether diisocyanate, 3,3'-dimethyl-4,4'-diphenylether diisocyanate, o-tolylene diisocyanate, 2,2-bis[4-(4-isocyanatophenoxy)phenyl]hexafluoropropane or 2,2-bis[4-(4-isocyanatophenoxy)phenyl]propane in an amount such that the properties of the above-described monomer are not impaired (about 30% by weight or less), Reaction temperature in the polymerization is preferably 40 to 150° C., and more preferably 50 to 140° C. When the reaction temperature is less than 40° C., the reaction time is too prolonged. Thus, such temperature is not practical. If the temperature is higher than 150° C., it is difficult to select an appropriate solvent.

Concentration of a diisocyanate monomer in the synthesis of a polycarbodiimide is 5 to 70% by weight (hereinafter simply referred to as "%"), and preferably 10 to 60%. If the concentration is less than 5%, carbodiimidization may not proceed. On the other hand, if the concentration exceeds 70%, there is a possibility of being difficult to control the reaction.

The organic solvent used in the synthesis of a polycarbodiimide and in preparing a polycarbodiimide solution may be conventional organic solvents. Examples of the organic solvent include halogenated hydrocarbons such as tetrachloroethylene, 1,2-dichloroethane and chloroform; ketone solvents such as acetone, methyl ethyl ketone, methyl isobutyl ketone and cyclohexane; cyclic ether solvents such as tetrahydrofuran and dioxane; and aromatic hydrocarbon solvents such as toluene and xylene. They can be used alone or in any mixture thereof.

As a catalyst to be used in carbodiimidization, any known phosphorus catalyst can suitably be used. Examples of the same include phosphorene oxides such as 1-phenyl-2-phosphorene-1-oxide, 3-methyl-2-phosphorene-1-oxide, 1-ethyl-2-phosphorene-1-oxide, 3-methyl-1-phenyl-2-phosphorene-1-oxide, and 3-phosphorene isomers thereof.

In any one of the end stage, middle stage or initial stage of a polymerization reaction, or throughout the reaction, monoisocyanate may be added to the reaction mixture to perform an end-capping treatment. Such a monoisocyanate which can be used is phenyl isocyanate, p-nitrophenyl isocyanate, p-tolyl isocyanate, m-tolyl isocyanate, p-formylphenyl isocyanate or p-isopropylphenyl isocyanate.

The polycarbodiimide solution thus obtained has an excellent storage stability.

After completion of the reaction, the reaction mixture may be poured into a poor solvent such as methanol, ethanol, hexane or isopropanol to precipitate polycarbodiimide, whereby unreacted monomer or a catalyst can be removed. A polycarbodiimide solution can be prepared according to the following process: The precipitated polycarbodiimide is washed and then dried according to a predetermined procedure, thereafter the dried polymer is redissolved in an organic solvent again. By effecting such procedure, the solution stability of polycarbodiimide can be improved.

By-products contained in the polymer solution may be adsorbed on an appropriate adsorbent to purify the solution. Examples of the adsorbent which can be used are alumina gel, silica gel, activated carbon, zeolite, activated magnesium oxide, activated bauxite, Fuller's earth, activated clay, molecular sieve carbon, and the like. They can be used alone or in any combination thereof.

The molecular weight of the carbodiimide of the present invention is 900 to 90,000, and preferably 3,500 to 18,000, in terms of a number average molecular weight. Namely in the formula (I), n is an integer of 2 to 200, and preferably 8 to 40. If the molecular weight of the polycarbodiimide is too large, gelation may readily occur within several minutes to several hours even if it is allowed to stand at an ordinary temperature. This phenomenon is not desirable in the practical use. On the other hand, if the molecular weight is too small, the resulting film undesirably lacks for reliability.

Production of Film and Adhesive Sheet

A polycarbodiimide film (or sheet) of the present invention can be obtained by forming a polycarbodiimide varnish into a film having an appropriate thickness according to a conventional method (e.g., casting, spin coating, or roll coating). This film is desirably dried at a temperature which is usually required to remove a solvent. The coating temperature is, for example, 20 to 350° C., and preferably 50 to 250° C. so that drying may be effected without considerably advancing a hardening reaction. If the drying temperature is lower than 220° C., a solvent remains in a resulting film to undesirably decrease the reliability of the film. On the other hand, if the drying temperature is higher than 350° C., a thermal hardening of a film may undesirably readily advance.

A polycarbodiimide composition of the present invention can be compounded with fine inorganic fillers in an amount which does not impair workability and heat resistance thereof. Further, in order to provide a surface smoothness, various additives such as a smoothing agent, a leveling agent and a defoaming agent may be added depending upon a necessity.

A molded article obtained by molding the polymer of the present invention in the form of a film can be used as a heat-resistant adhesive sheet. Thickness of the sheet which can be molded into a film or an adhesive sheet is generally 1 to 200 μm. However, the thickness is not limited thereto and can be optionally selected depending upon an object for use. A shape or a size of the sheet also can optionally be selected depending upon an adherend such as a lead frame or semiconductor chip.

In producing an adhesive sheet, in order to impart conductivity, improve heat transfer property, control elasticity modulus, and, especially, attain a high elasticity, for example, metals (e.g., aluminum, copper, silver, gold, nickel, chromium, lead, tin, zinc, palladium or solder), or alloys thereof; ceramics (e.g., alumina, silica, magnesia or silicon nitride); and other various inorganic powders comprising carbon can be compounded alone or in any mixture thereof.

Alternatively, the film can be formed on a support to form an adhesive sheet. In order to produce the adhesive sheet having such a construction, a varnish may be coated on the support. Alternatively, the film is previously formed, and is then laminated on the support by means of a press.

The support which can be used is a metal foil and an insulating film. Examples of the metal foil include metals (e.g., aluminum, copper, silver, gold, nickel, indium, chromium, lead, tin, zinc or palladium), and alloys thereof. Examples of the insulating film include heat-resistant or chemical-resistant films such as polyimide, polyester and polyethylene terephthalate.

The metal foil and the insulating film can be used alone or as a two or more layered product, for example, a two layered substrate of a metal foil/insulating film laminate. The two layered substrate is, for example, copper/polyimide two layered substrate.

A sheet-like adhesive of the present invention is thermally cured by a thermal treatment to develop a strong adhesion and also form a cured product having a low hygroscopicity. In order to conduct the heat treatment, an optional method, for example, a heater, ultrasonic waves or ultraviolet rays can be used. Accordingly, the adhesive sheet of the present invention is desirable for adhesion treatment of various materials. Particularly, it is desirable for sealing treatment of electric and electronic parts represented by a semiconductor chip and a lead frame, which are required to be subjected to a highly reliable sealing treatment and, therefore, are required to have a low hygroscopicity. The adhesive sheet of the present invention is excellent in the following points: it is low hygroscopic, it is highly flexible so that it can be readily handled, it has a good adhesion to a semiconductor element, and it has a desirable storage stability.

Object for Use

The polycarbodiimide resin thus produced also can be used by utilizing the thermal resistance thereof as an adhesive of electric and electronic parts.

Monomer

The production method of a monomer of the polycarbodiimide is explained below.

A diisocyanate compound which is a starting material of the polycarbodiimide of the present invention, i.e., bis[4-(3-isocyanatophenoxy)phenyl]sulfone or bis[4-(4-isocyanatophenoxy)phenyl]sulfone (the above-described formula (II)), can be produced by diisocyanating bis[4-(3-aminophenoxy)phenyl]sulfone or bis[4-(4-aminophenoxy)phenyl]sulfone which is a precursor thereof according to a method known per se.

The diisocyanation method of a diamine compound is, for example, a method of reacting with phosgene, diphenyl carbonate or carbonyl diimidazole. Alternatively, a diamine compound is converted to a dicarbamate using a halogenated alkyl formate or a halogenated aryl formate, which is then diisocyanated in the presence of an activating agent such as chlorosilane or catechol borane. Still another method which can be employed is a method of using a dicarboxylic acid such as bis[4-(3-carboxyphenoxy)phenyl]sulfone or bis [4-(4-carboxyphenoxy)phenyl]sulfone, which is the precursor of the diisocyanate, and diisocyanating the same by Curtius decomposition.

Of these production methods, a method wherein a diamine compound is converted to a dicarbamate with a halogenated alkyl formate or a halogenated aryl formate, which is then diisocyanated in the presence of chlorosilane as an activating agent (G. Greber, et al., Angew. Chem. Int. Ed., Vol. 17, No. 12, 941 (1968)) or a method using catechol boran as an activating agent (V. L. K. Valli. at al., J. Org.

Chem., Vol. 60, 257 (1995)) is preferable from the standpoints of yield and safety.

Synthesis of Dicarbamate

A dicarbamate is synthesized by reacting methylchloroformate, ethylchloroformate, phenylchloroformate or p-nitrophenylchloroformate with a corresponding diamine compound.

A solvent used in the reaction can be any solvent so long as a diamine can be dissolved therein. Examples of the solvent are ether compounds (e.g., THF, dioxane and diethyl ether); aromatic hydrocarbon compounds (e.g., toluene, xylene and benzene); ketone compounds (e.g., acetone and methyl ethyl ketone); and ester compounds (e.g., ethyl acetate). These solvents can be used alone or in any mixture thereof.

The reaction temperature is −40 to 100° C., and preferably −20 to 80° C. If the reaction temperature is less than −40° C., the reaction time is too long so that such temperature is not practical. On the other hand, if it exceeds 100° C., the formed dicarbamate possibly may decompose.

A base for trapping hydrogen chloride formed by the reaction can be any bases as long as it can be dissolved in a solvent used and does not inhibit the reaction. Examples of the base used include triethylamine, sodium hydroxide, pyridine and 1,8-diazabicyclo[5,4,0]-7-undecene.

The resulting dicarbamate can be purified by a conventional method such as recrystallization or a column chromatography. Further, distillation may be effected depending upon a necessity.

Diisocyanation (a) Diisocyanation Using Chlorosilane

In order to convert the above-described dicarbamate to a diisocyanate using chlorosilane, a thermal decomposition of the diisocyanate is conducted using chlorosilane as an activating agent in an amount of 1.5 to 4.6 times, and preferably 1.7 to 3.0 times, the molar amount of the dicarbamate. If the amount of chlorosilane is less than 1.5 times, the reaction possibly may proceed insufficiently. On the other hand, if it exceeds 4.6 times, the polymerization proceeds excessively so that the molecular weight possibly may excessively increase. Further, it may sometimes occur that an unreacted product is difficult to be removed. Examples of the chlrosilanes include trimethylchlorosilane, dimethyldichlorosilane and tetrachlorosilane. From the standpoint of cost and ease in handling, trimethylchlorosilane is preferable.

A solvent to be used can be any solvent so long as the dicarbamate can be dissolved or suspended therein. Examples of the solvent include the above-described ether compounds, aromatic compounds and halogenated compounds.

The reaction temperature is from 0° C. to the boiling point of a solvent used. In order to trap hydrogen chloride generated in the reaction, a base such as triethylamine can be used as in the above. The amount of the base is 1.5 to 4.6 times, preferably 1.7 to 3.0 times, and more preferably 1.8 to 2.0 times, the molar amount of the dicarbamate. If the amount of the base is less than 1.5 times, the reaction possibly may proceed insufficiently. On the other hand, if it exceeds 4.6 times, it may sometimes occur that an unreacted product is difficult to be removed.

(b) Diisocyanation Using Halogenated Catecholborane

For diisocyanation of the dicarbamate, a method can be used wherein instead of the above-described chlorosilane, halogenated catecholborane is used as an activating agent. The halogenated catecholborane includes chlorocatecholborane and bromocatecholborane. Solvent used in such a reaction can be the same solvent as those used in the above-descried diisocyanation using chlorosilane. The reaction temperature is generally −50 to 80° C., and preferably −20 to 70° C. Abase used for trapping hydrogen chloride generated in the reaction can be the same base as those described above.

After completion of the reaction, the solvent is removed, and the isocyanate monomer thus obtained can be purified according to a conventional method.

It should be noted that the above-described dicarbamation, diisocyanation and carbodiimidization of a diamine can be advanced stepwise by conducting isolation and purification in respective steps. Alternatively, these steps are continuously conducted in one reaction vessel as a series of reaction.

The present invention will be described in more detail by reference to the following Examples and Comparative Examples, but it should be understood that the invention is not construed as being limited thereto. Properties of the resulting polycarbodiimide were measured as follows.

IR

IR was measured using FT/IR-230 (manufactured by Nippon Denshi K.K.).

Thermal Crosslinking Temperature (Tc) and Glass Transition Temperature (Tg)

Tc and Tg were measured using DSC-200 (manufactured by Seiko Denshi Kogyo K.K.). Exothermic peak of a trimerization was determined as a thermal crosslinking temperature Tc).

Thermal Decomposition Initiation Temperature (Td)

Td was measured using TG/DTA300 (manufactured by Seiko Denshi Kogyo K.K.). 5% weight loss temperature was determined as Td.

Number Average Molecular Weight ($\overline{Mn}$)

$\overline{Mn}$ was measured using HLC8120 (manufactured by Tosoh Corporation) as an apparatus, and GMHHR-H+GHRHR-H+G200HHR (manufactured by Tosoh Corporation) as a column.

Elasticity (E')

E' was measured using DMS210 (manufactured by Seiko Denshi Kogyo K.K.).

EXAMPLE 1

Polycarbodiimidization of bis[4-(3-aminophenoxy) phenyl]sulfone 10.1 g (23.1 mmol) of bis[4-(3-aminophenoxy)phenyl] sulfone, 100 ml of THF and 4.72 g (46.2 mmol) of triethylamine were charged into a 300 ml three-necked flask. 7.24 g (46.2 mmol) of phenylchloroformate was charged to a dropping funnel and the flask was cooled to 0° C. in an ice bath. Phenylchloroformate was added thereto for several seconds, and the resulting mixture was stirred overnight while raising the temperature to room temperature. 6.10 g (60.1 mmol) of triethylamine and 6.51 g (60.1 mmol) of trimethylchlorosilane were added to the flask and the resulting mixture was stirred at 60° C. for 3 hours. The temperature of the reaction mixture was cooled to room temperature and a carbodiimidization catalyst, i.e., 3-methyl-1-phenyl-2-phosphorene-1-oxide (0.222 g, 1.16 mmol), was added thereto. The resulting mixture was stirred at 60° C. for 2 hours. The mixture was allowed to stand to cool to room temperature, and salt formed was removed by filtration. Further, reprecipitation was effected with 1.0 liter of n-hexane. The precipitate obtained was dried at 30° C. for 8 hours under reduced pressure to obtain white powdery polycarbodiimide 4.49 g (10.2 mmol) (44%). The number average molecular weight ($\overline{M}n$) of this polycarbodiimide was 2,900. Carbodiimidization was confirmed by IR absorption spectrum (see FIG. 1).

The above-obtained white powder was soluble in an organic solvent such as THF, cyclohexanone or chloroform. Varnish obtained by dissolving 0.6 g of this white powder in 1.8 g of cyclohexanone was cast on a glass plate, followed by drying at 90° C. for 10 minutes, and then at 250° C. for 30 minutes, to obtain a film. Even though the resulting film was dried at 300° C. for 20 minutes, the film still had flexibility. The thermal closslinking temperature, the thermal decomposition initiation temperature and the glass transition temperature of the resulting film were measured. The results were Tc=400° C., Td=440° C. and Tg=210° C., respectively. Modulus of elasticity (E') of the film at room temperature was 3.2 GPa. 20% by weight varnish obtained by dissolving 2.0 g of the white powder obtained above in 8.0 g of toluene could be stably stored at room temperature for 2 months.

EXAMPLE 2

Figure 2:
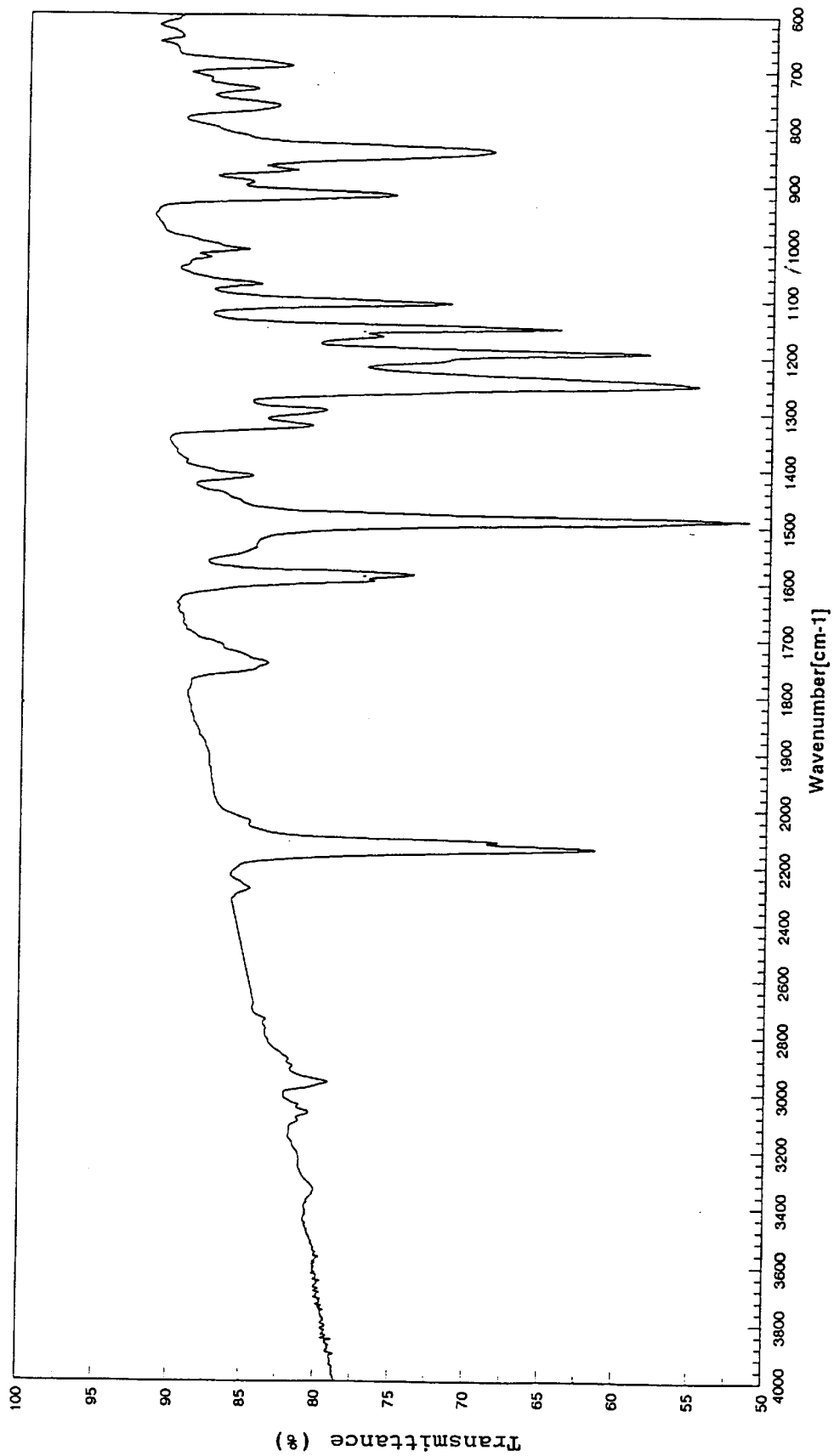
FIG. 2 is a graph showing an infrared absorption spectrum of Example 2.

Polycarbodiimidization of bis[4-(4-aminophenoxy)phenyl]sulfone 10.0 g (23.1 mmol) of bis[4-(4-aminophenoxy)phenyl]sulfone, 150 ml of THF and 4.72 g (46.2 mmol) of triethylamine were charged into a 300 ml three-necked flask. 7.24 g (46.2 mmol) of phenylchloroformate was charged to a dropping funnel, and the flask was cooled to 0° C. in an ice bath. Phenylchloroformate was added for several seconds. The resulting mixture was stirred overnight while raising the temperature to room temperature. 6.61 g (64.7 mmol) of triethylamine and 7.03 g (64.7 mmol) of trimethylchlorosilane were added to the flask and the resulting mixture was stirred at room temperature for 2 hours, followed by refluxing for 3 hours. The temperature of the mixture was cooled to room temperature and 0.522 g (2.31 mmol) of a carbodiimidization catalyst (3-methyl-1-phenyl-2-phosphorene-1-oxide) was added. The reaction mixture was refluxed for 1 hour. The resulting mixture was allowed to stand to cool to room temperature and salt formed was removed by filtration. Reprecipitation was conducted using 1.0 liter of n-hexane. The precipitate obtained was dried at 30° C. for 8 hours under reduced pressure to obtain 7.34 g (16.7 mmol, 72%) of white powdery polycarbodiimide. The number average molecular weight of this polycarbodiimide was 4,000. Carbodiimidization was confirmed by IR absorption spectrum (see FIG. 2).

The white powder obtained above was soluble in an organic solvent such as THF, cyclohexanone or chloroform. Varnish obtained by dissolving 0.6 g of this white powder in 1.8 g of cyclohexanone was cast on a glass plate, followed by drying at 90° C. for 10 minutes, and further at 250° C. for 30 minutes to obtain a film. Even though the resulting film was dried at 300° C. for 20 minutes, the film still had flexibility. The thermal closslinking temperature, the thermal decomposition initiation temperature and the glass transition temperature of the resulting film were measured. The results were Tc=390° C., Td=430° C. and Tg=240° C., respectively. Modulus of elasticity (E') of the film at room temperature was 1.7 GPa. 20% by weight varnish obtained by dissolving 2.0 g of the white powder obtained above in 8.0 g of toluene could be stably stored at room temperature for 2 months.

COMPARATIVE EXAMPLE 1

10 g (40 mmol) of MDI was reacted together with 60 mg (0.31 mmol) of a carbodiimidization catalyst (3-methyl-1-phenyl-2-phosphorene-1-oxide) in 50 ml of THF at 60° C. for 2 hours. The resulting reaction solution was cast on a glass plate to form a film. The film had a thermal crosslinking temperature of 350° C. When the film was subjected to a thermal treatment at 250° C. for 1 hour, the film discolored, and lost flexibility and self-supporting property. The white powdery polycarbodiimide obtained by reprecipitation of the resulting solution was not redissolved in organic solvents such as THF, cyclohexanone, toluene and acetone.

EXAMPLE 3

The varnish produced in Example 1 was coated on a copper foil (thickness 105 μm), which was dried at 200° C. for 10 minutes, thereby obtaining an adhesive sheet wherein an adhesive layer had a thickness of 50 μm. The adhesive sheet obtained was adhered to 42 alloy plate and pressed for one second under a pressure of 50 kg/cm² at 300° C. As a result of the measurement of adhesive force, it showed 1,000 kg/cm. As a result of a solder heat-resistant test of this substrate, it showed a good adhesion. The adhesive layer had Tg of 140° C., modulus of elasticity (E') at 240° C. of 70 MPa, water absorption of 0.1% and weight loss of 0.2%.

EXAMPLE 4

The varnish produced in Example 2 was coated on a copper foil (thickness 105 μm), which was dried at 150° C. for 30 minutes, thereby obtaining an adhesive sheet wherein an adhesive layer had a thickness of 30 μm. The adhesive sheet obtained was adhered to 42 alloy plate and pressed for one second under a pressure of 50 kg/cm² at 350° C. As a result of the measurement of adhesive force, it showed 860 kg/cm. As a result of a solder heat-resistant test of this substrate, it showed a good adhesion. The adhesive layer had Tg of 131° C., modulus of elasticity (E') at 231° C. of 50 MPa, water absorption of 0.2% and weight loss of 3%.

The polycarbodiimide of the present invention has a high solubility in an organic solvent and a high processability, and also shows excellent heat resistance and moisture resistance. Therefore, it can be used as a heat-resistant coating material in soldering process in the production of electronic parts.

While the invention has been described in detail and with reference to specific embodiments thereof, it will be apparent to one skilled in the art that various changes and modification can be made therein without departing from the spirit and scope thereof.

What is claimed is:

1. An aromatic polycarbodiimide comprising a structural repeating unit represented by the following formula (I):

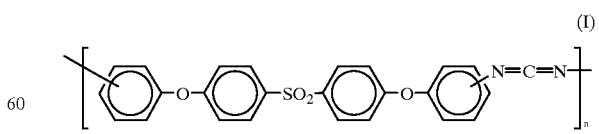

wherein n is an integer of 2 to 200.

2. A polycarbodiimide solution comprising an aromatic polycarbodiimide comprising a structural repeating unit represented by the following formula (I):

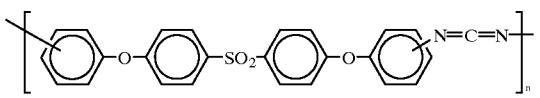

wherein n is an integer of 2 to 200, dissolved in an organic solvent.

3. A polycarbodiimide film comprising an aromatic polycarbodiimide comprising a structural repeating unit represented by the following formula (I):

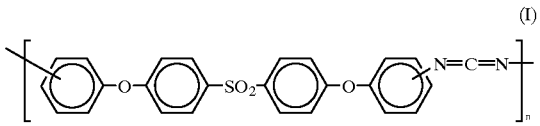

wherein n is an integer of 2 to 200.

4. An aromatic polycarbodiimide according to claim 1, wherein the aromatic polycarbodiimide has a number average molecular weight of 900 to 90,000.

5. An aromatic polycarbodiimide according to claim 4, wherein the aromatic polycarbodiimide has a number average molecular weight of 3,500 to 18,000.

6. An aromatic polycarbodiimide according to claim 1, wherein n is an integer from 8 to 40.

7. A polycarbodiimide solution according to claim 2, wherein the aromatic polycarbodiimide has a number average molecular weight of 900 to 90,000.

8. A polycarbodiimide solution according to claim 7, wherein the aromatic polycarbodiimide has a number average molecular weight of 3,500 to 18,000.

9. A polycarbodiimide solution according to claim 2, wherein n is an integer from 8 to 40.

10. A polycarbodiimide film according to claim 3, wherein the aromatic polycarbodiimide has a number average molecular weight of 900 to 90,000.

11. A polycarbodiimide film according to claim 10, wherein the aromatic polycarbodiimide has a number average molecular weight of 3,500 to 18,000.

12. A polycarbodiimide film according to claim 3, wherein n is an integer from 8 to 40.

* * * * *